Feb. 11, 1969    H. MARSDEN    3,427,099
FILM SYNCHRONIZER

Filed Dec. 6, 1965    Sheet 1 of 3

Harry Marsden *Inventor*

By Dowell M Dowell
*Attorneys*

Feb. 11, 1969　　　　　　　H. MARSDEN　　　　　　　3,427,099
FILM SYNCHRONIZER

Filed Dec. 6, 1965　　　　　　　　　　　　　　Sheet 3 of 3

Inventor
Harry Marsden
By Dowell H. Dowell
Attorney

United States Patent Office 3,427,099
Patented Feb. 11, 1969

3,427,099
FILM SYNCHRONIZER
Harry Marsden, Dartford, Kent, England, assignor to Robert Rigby Limited, London, England
Filed Dec. 6, 1965, Ser. No. 511,767
Claims priority, application Great Britain, Dec. 4, 1964, 49,563/64
U.S. Cl. 352—12   8 claims
Int. Cl. G03b 31/02

ABSTRACT OF THE DISCLOSURE

A film synchronizer having a number of ganged sprockets for feeding a number of films and a pickoff head for each sprocket which is to feed a film bearing a sound head mounting means for the pickoff head enabling the latter to be located on the film synchronizer, on the sprocket side of the film, in alternative positions according as the sound track is transversely disposed on the film.

---

This invention relates to film synchronizers, i.e., devices for synchronizing picture and sound recordings. It is particularly concerned with the mounting arrangements of the magnetic sound reproducting heads.

The usual film synchronizer comprises a number of ganged film-sprockets by rotation of which optical film and the film (or films) containing the sound track may be moved past a selected station in synchronism. Thus, if it is desired to remove a sequence of picture frames from the optical film, once they have been located by using the synchronizer, a corresponding length of track can be removed from adjacent sound track films and the synchronism between the picture and the sound track thereby preserved.

In the procedure generally used, some means of identifying the positions on the optical film where picture frames are to be removed are employed, this being, frequently, some form of counter which totalizes a sequence of identifying marks on the film (for example, sprocket holes) from its beginning, and the totals corresponding to the parts of the film to be removed are noted. A corresponding counter, positively coupled to the sprockets of the synchronizer is then used to register the film relatively to the said station at the positions on the film where these totals occur. The same procedure is employed if frames are to be added to the film.

The film containing the sound track may have magnetic tracks, and magnetic pickoff heads are usually provided for each film to monitor the sound so as to facilitate finding the optimum position on the films for editing, e.g., so that cuts do not produce aberrations in reproduction.

Sound tracks are usually recorded either along the axis of the film (center track) or along an edge (edge track). The pickoff heads must, of course, be located accurately opposite a track and the invention is concerned with simplifying the setting of the pickoff heads in their appropriate positions.

In accordance with the invention, in a film synchronizer having a number of ganged sprockets for feeding a number of films, a magnetic pickoff head is provided for any sprocket which is to feed a film bearing a sound track and has a plug and socket arrangement enabling it to be located on the film synchronizer, on the sprocket side of the film, in alternative positions according as the sound track is transversely disposed on the film.

There may be one socket for use with a pickoff head the detecting element of which is offset so that by reversing the head the detecting element takes up the desired position opposite the particular track in use. Alternatively there can be two sockets side by side for use with a symmetrical head so that the head can be positioned by selection of the appropriate socket into which it is plugged. To prevent rotation of the plug in the socket the plug and socket are given a nonround cross-section.

The plug and socket may incorporate the electrical connections for the head: for example, the plug may carry a printed circuit board having conductive areas which contact pickup wipers in the socket when the connection is made. Alternatively the electrical connections may be made by a separate plug and socket, the plug being electrically connected to the head by a flexible lead.

In an alternative arrangement, the head may be provided with the socket (or sockets), the plug (or plugs) being mounted on the synchronizer.

The invention will be further described by way of example and with reference to the accompanying drawings wherein.

Figure 2:
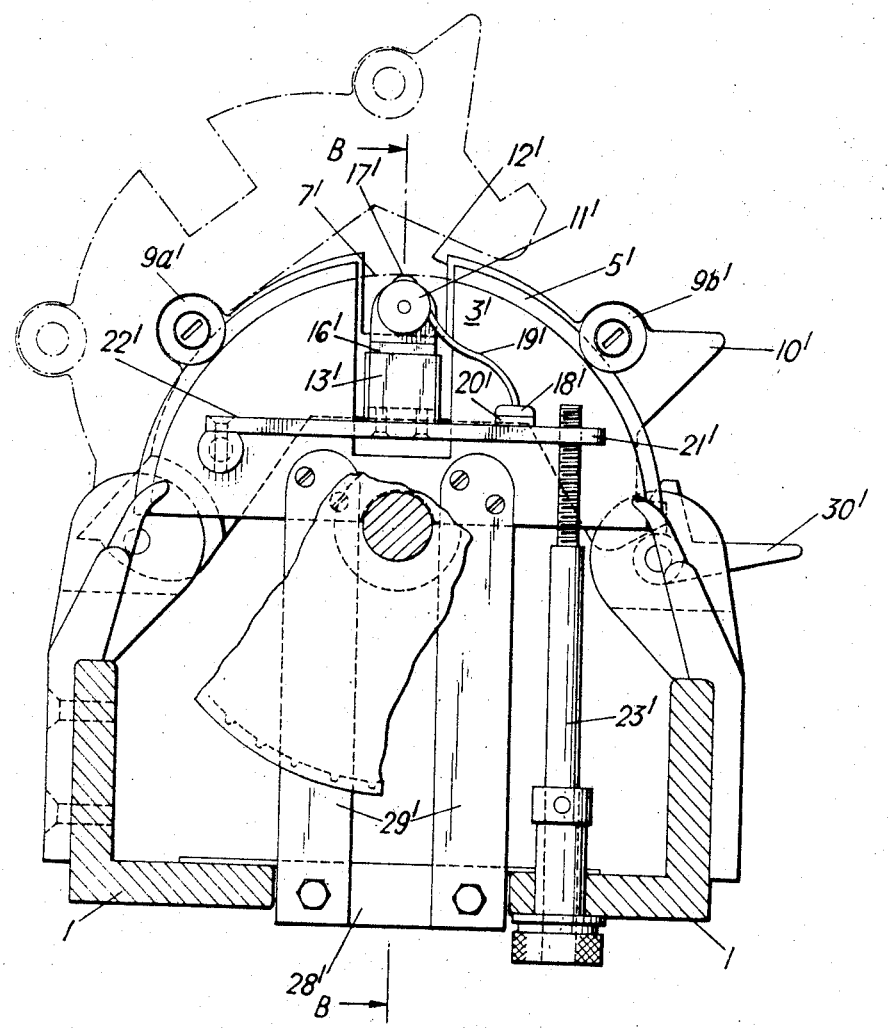
FIGURE 2 shows a vertical section through the film synchronizer of FIGURE 1, the section being taken along the vertical plane AA of FIGURE 1.

Referring to FIGURES 1 to 4 the synchronizer includes a frame 1 in which are mounted, side by side, four ganged 16 mm. film-sprockets 2, 2′, 2″, 2‴. Parallel to but spaced apart from each sprocket is arranged an upstanding, stationary, semicircular, film-guiding plate 3, 3′, 3″ or 3‴ called hereinafter a "gate." Each gate is coaxial with its associated sprocket being supported on the frame 1 via a bracket and two straps. Referring to FIGURE 2 by way of example, gate 3′ is supported on the frame 1 by a bracket 28′ and straps 29′, and has a radius equal to the teeth-root radius of the sprocket. Both sprockets and gates have radially extending flanges which are disposed, for each associated pair, contiguous with the nonfacing axial surfaces of the pair. A pair 4′, 5′ of such flanges corresponding to the second channel of the synchronizer is particularly shown in FIGURE 3. Each pair of flanges thus defines a circumferential channel 6, 6′, 6″, 6‴ subtending an angle of about 180°.

The films are placed in these channels in engagement with the sprocket teeth and move through them in synchronism when the sprockets are rotated. Retaining rollers are provided along the channels which maintain the films in engagement with sprocket teeth.

Figure 3:
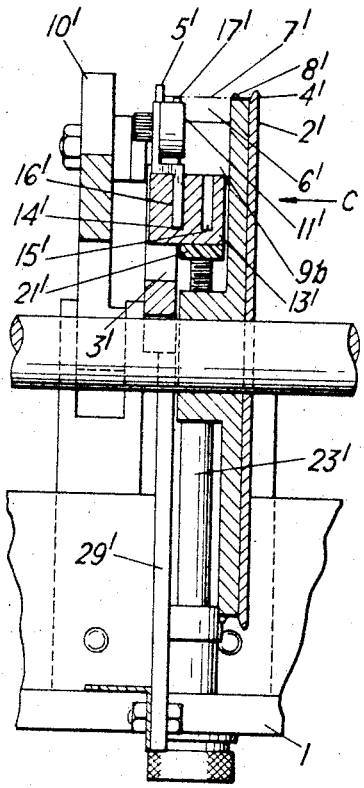
FIGURE 3 shows a vertical section through one channel of the film synchronizer of FIGURE 1, the section being taken along the plane BB shown in FIGURE 2.

Hence in FIGURE 3 there is shown a film 7′ retained in the channel 6′ by roller 9b′ and engaging with the teeth 8′ of the sprocket 2′. The rollers are mounted on a bracket 10′ which is hinged in a plane parallel to the plane of rotation of the associated sprocket and they can thereby be moved away from the channel (as shown in ghosted outline in FIGURE 2) so as to provide access for loading or unloading the film. Normally the bracket is fastened in the film engaging position by detent means which comprise for example in channel 6′ a catch 30′ pivoted on the frame 1 which engages a shoulder 31′ on the end of the bracket 10′.

Three of the channels, i.e., channels 6′, 6″ and 6‴ (being the sound track channels) are equipped to monitor magnetic tracks having pickoff heads 11′, 11″, 11‴. The fourth, i.e., channel 6 being that channel having its sprocket on the outside of the assembly of sprockets and gates, is intended to feed the optical film and is not therefore equipped with a pickoff head. The sound track channels are identical one to another and will be further described with reference to channel 6' only.

In this channel, the pickoff head 11' is positioned to be beneath the film in the space between the sprocket 2' and the gate 3' and at the top, or 12 o'clock position of the channel. The gate is cut away adjacently to the head at 12' so as to allow the head to be disposed for monitoring a sound track at the edge of the film. This cutout space facilitates access to the head.

Figure 4:
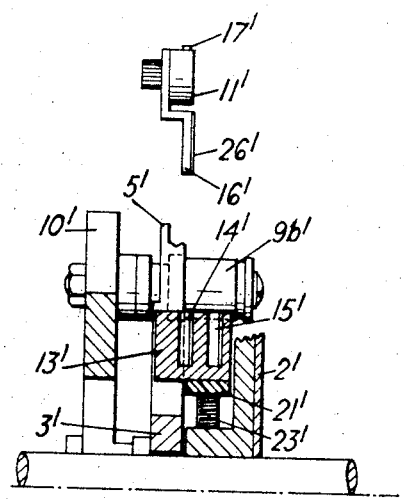
FIGURE 4 shows a fragmentary detailed view corresponding to the detail in FIGURE 3 which is indicated generally by the arrow C but differing in that the pickoff head is shown removed from its socket, and the plug and socket arrangement incorporate integral electrical connection means.

Referring particularly to FIGURES 2, 3 and 4, a socket housing, 13' having two side by side sockets 14', 15' into either of which the head plug 16' is located perpendicularly above the sprocket's axis, being vertically adjustable in position. With head plugged into the socket adjacent to the gate it is accurately aligned for monitoring a sound track at the edge of the film. The socket 15' provides for center track monitoring. Each socket is in the form of a rectangular aperture and the plug 16' on the head has a corresponding shape.

The detecting element 17' is positioned at the top of the head so as to be near to the sound track.

Electrical connections to the head are made by means of a plug 18' connected to the head with a flexible lead 19' and a socket 20' disposed on the synchronizer between the sprocket and gate.

The mounting means for both sockets comprise a strip of transparent, resilient, plastics material 21' fixed at end 22' to the gate 3' and made to flex by a displacement of the other end. The extent of the displacement is set by means of turning a thumbscrew 23', adjustment of which alters the height of the head and thereby enables its position to be regularized taking account of any wear which has occurred on the detecting element. Transparent material is employed so that light can penetrate on to the film from beneath the synchronizer, this bing advantageous in cases where optical film, as opposed to magnetic film, is being edited. A translucent material might be substituted. It is important that the material chosen should provide a firm support for the head and it is advantageous for the material to possess negligible mechanical hysteresis.

Adjacent to the sprocket 2 of the optical film channel the frame 1 defines an opening 24 which exposes a small area in the 12 o'clock position of the sprocket's facing axial surface. Corresponding with the opening there is provided on the said axial surface a concentric annular area which is circumferentially divided into a sequence of numbered equal areas each of which corresponds to one tooth of the sprocket. A counter 25 is provided, coupled to the sprockets, having a least significant digit wheel synchronized with the sequence of numbers shown in the opening. The opening defines the reading station and the pickoff heads are aligned to it.

The synchronizer is intended for operation by hand using the handle 28 and the moving parts are constructed to spin freely. Alternatively it can, of course, be coupled to any convenient form of mechanical drive. A brake (not shown) is usually provided so that the sprockets can be held in any position against rotation.

Referring to FIGURE 4, as an alternative arrangement, the electrical connections of the pickoff head may be included as part of the plug and socket arrangement 16', 14' (or 15'). This may be done in any conventional manner. FIGURE 4 shows the use of a printed circuit board 26' the circuit of which engages, when the plug is inserted in the socket, with corresponding contacts (not shown) in the socket 14' (or 15'). The flying lead 19', additional plug 18' and socket 20' are dispensed with.

Figure 1:
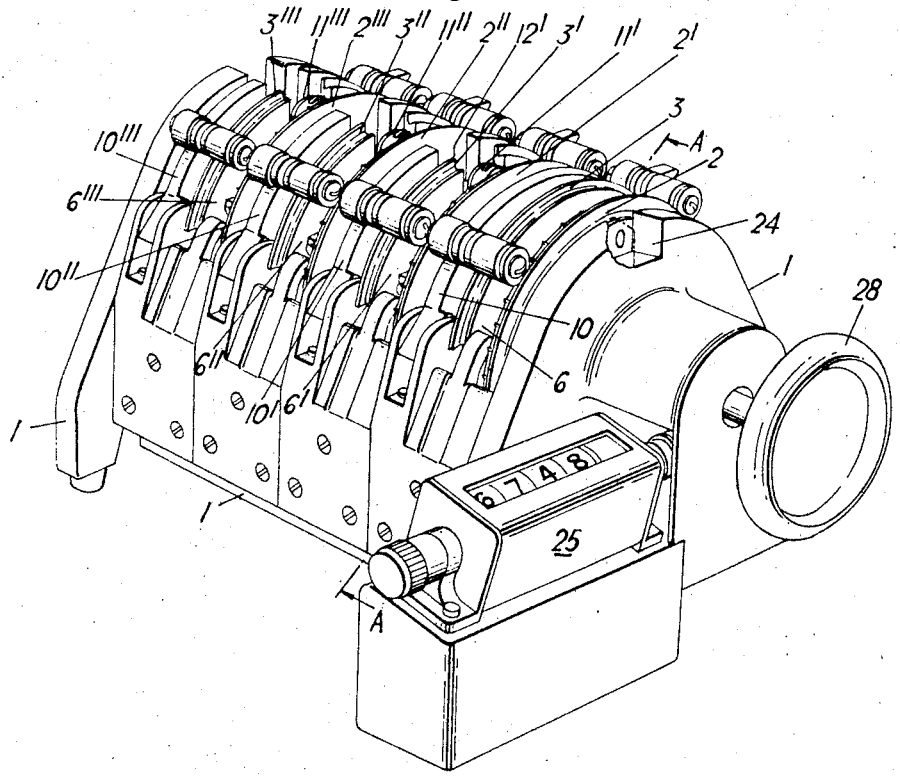
FIGURE 1 shows a four-channel 16 mm. film synchronizer according to the invention in perspective view.
Figure 5:
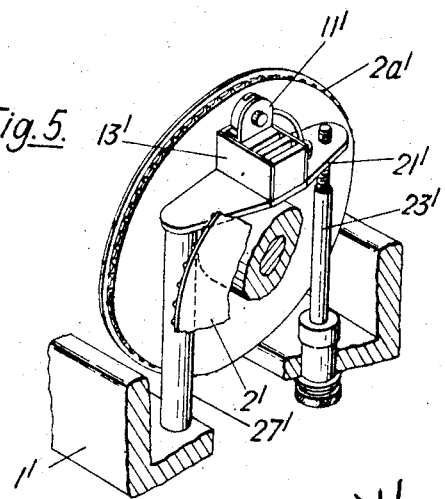
FIGURE 5 shows a fragmentary perspective view of a single 35 mm. channel.

The film synchronism may be assembled to suit any standard type film, the varying widths of different types of such film usually being catered for by adjusting the distance between the gate 3 and the sprocket 2. A special case occurs with 35 mm. film which has sprocket holes on both sides. The magnetic track of such film is spaced away from the edge of the film, and therefore there is no necessity to provide the cutout 12. As seen in FIGURE 5 the gate is dispensed with altogether and a second ganged sprocket 2(a)' inserted in its place, at the appropriate distance from the first sprocket 2'. In this embodiment strip 21' is secured to a rigid mounting post 27' which is itself mounted on the frame 1. This embodiment also provides three emplacements for the pickoff head 11' there being three sockets in the housing 13'.

I claim:
1. A film synchronizer having a number of ganged sprockets for feeding a number of films and a pickoff head for each sprocket which is to feed a film bearing a sound track, wherein there is provided a multiposition pickup head mounting means for the pickoff head enabling the latter to be located on the film synchronizer, on the sprocket side of the film, in alternative positions according as the sounding track is transversely disposed on the film.

2. A film synchronizer according to claim 1 wherein the multiposition pickup head mounting means incorporates electrical connectors for connecting the pickup to an external circuit.

3. A film synchronizer according to claim 1 wherein there is provided a plug and socket arrangement for making electrical connections whereby the pickup may be connected electrically to an external circuit.

4. A film synchronizer according to claim 1 wherein the mounting means for locating the pickup head includes a plug and socket which have corresponding, rectangular, cross-sections.

5. A film synchronizer according to claim 4 wherein there is provided a plurality of sockets relating to the mounting means, the sockets being arranged side by side along an axis parallel to the sprocket axis.

6. A film synchronizer according to claim 4 wherein the pickup head is carried by the plug and is mounted about a vertical axis which is parallel to but offset from the vertical axis of the plug in a direction parallel to the axis of the sprockets.

7. A film synchronizer according to claim 6 wherein the socket is arranged in a housing mounted on a strip of resilient plastics material which is fixed at one end, there being means provided at the other end whereby the strip may be made to flex in order to facilitate a vertical adjustment in the position of the said housing.

8. A film synchronizer according to claim 7 wherein the plastics material is transparent or translucent.

References Cited
UNITED STATES PATENTS

| | | | |
|---|---|---|---|
| 2,334,547 | 11/1943 | Esper | 352—8 |
| 2,590,956 | 4/1952 | Gille | 352—37 X |
| 3,139,788 | 7/1964 | Hughes et al. | 352—8 X |

FOREIGN PATENTS 206,096 5/1955 Australia.

JULIA E. COINER, *Primary Examiner.*

U.S. Cl. X.R.

352—8, 13